(12) United States Patent
Howell et al.

(10) Patent No.: US 8,095,261 B2
(45) Date of Patent: Jan. 10, 2012

(54) AGGREGATED INFORMATION FUSION FOR ENHANCED DIAGNOSTICS, PROGNOSTICS AND MAINTENANCE PRACTICES OF VEHICLES

(75) Inventors: Mark N. Howell, Rochester Hills, MI (US); Mutasim A. Salman, Rochester Hills, MI (US); Xidong Tang, Sterling Heights, MI (US); Yilu Zhang, Northville, MI (US); Xiaodong Zhang, Mason, OH (US); Yuen-Kwok Chin, Troy, MI (US); Soumen De, Bangalore (IN); Debprakash Patnaik, Bangalore (IN); Sabyasachi Bhattacharya, Bangalore (IN); Pulak Bandyopadhyay, Bangalore (IN); Balarama V. Murty, West Bloomfield, MI (US); Ansaf I. Alrabady, Livonia, MI (US); Rami I. Debouk, Dearborn, MI (US); Steven W. Holland, St Clair, MI (US); George Paul Montgomery, Jr., Beverly Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 455 days.

(21) Appl. No.: 12/398,895

(22) Filed: Mar. 5, 2009

(65) Prior Publication Data
US 2010/0228423 A1 Sep. 9, 2010

(51) Int. Cl.
*G01M 17/00* (2006.01)
*G06F 11/00* (2006.01)
(52) U.S. Cl. ........................ 701/29.1; 340/438; 702/183
(58) Field of Classification Search .................. 307/116; 340/438, 439, 500, 514, 517; 701/29, 30, 701/33–35; 702/183–185
See application file for complete search history.

(56) References Cited

U.S. PATENT DOCUMENTS

| | | | | |
|---|---|---|---|---|
| 6,330,499 B1 * | 12/2001 | Chou et al. | ...................... | 701/33 |
| 6,415,395 B1 * | 7/2002 | Varma et al. | .................... | 714/37 |
| 6,609,051 B2 * | 8/2003 | Fiechter et al. | ................. | 701/33 |
| 6,636,790 B1 * | 10/2003 | Lightner et al. | ................ | 701/33 |
| 6,662,091 B2 * | 12/2003 | Wilson et al. | .................. | 701/33 |
| 6,738,697 B2 * | 5/2004 | Breed | ............................. | 701/29 |
| 6,795,935 B1 * | 9/2004 | Unkle et al. | .................... | 714/37 |
| 6,834,256 B2 * | 12/2004 | House et al. | ................... | 702/181 |
| 6,981,182 B2 * | 12/2005 | Roddy et al. | ................. | 714/47.3 |
| 7,092,803 B2 * | 8/2006 | Kapolka et al. | ................. | 701/29 |
| 7,092,937 B2 * | 8/2006 | Morgan et al. | ................ | 707/736 |
| 7,509,234 B2 * | 3/2009 | Unnikrishnan et al. | ...... | 702/183 |
| 7,526,461 B2 * | 4/2009 | Srinivasa et al. | ................ | 706/20 |
| 7,558,771 B2 * | 7/2009 | Barajas et al. | ................. | 706/46 |
| 7,715,961 B1 * | 5/2010 | Kargupta | ........................ | 701/33 |
| 7,739,007 B2 * | 6/2010 | Logsdon | ......................... | 701/33 |

(Continued)

*Primary Examiner* — Paul N Dickson
*Assistant Examiner* — Laura Freedman
(74) *Attorney, Agent, or Firm* — John A. Miller; Miller IP Group, PLC

(57) ABSTRACT

A system and method for enhancing vehicle diagnostic and prognostic algorithms and improving vehicle maintenance practices. The method includes collecting data from vehicle components, sub-systems and systems, and storing the collected data in a database. The collected and stored data can be from multiple sources for similar vehicles or similar components and can include various types of trouble codes and labor codes as well as other information, such as operational data and physics of failure data, which are fused together. The method generates classes for different vehicle components, sub-systems and systems, and builds feature extractors for each class using data mining techniques of the data stored in the database. The method also generates classifiers that classify the features for each class. The feature extractors and feature classifiers are used to determine when a fault condition has occurred for a vehicle component, sub-system or system.

20 Claims, 3 Drawing Sheets

U.S. PATENT DOCUMENTS

| | | | |
|---|---|---|---|
| 2002/0007237 A1* | 1/2002 | Phung et al. | 701/33 |
| 2002/0173885 A1* | 11/2002 | Lowrey et al. | 701/29 |
| 2008/0141072 A1* | 6/2008 | Kalgren et al. | 714/33 |
| 2009/0216399 A1* | 8/2009 | Ishikawa | 701/33 |
| 2009/0254240 A1* | 10/2009 | Olsen et al. | 701/30 |
| 2009/0271066 A1* | 10/2009 | Underdal et al. | 701/35 |
| 2010/0063668 A1* | 3/2010 | Zhang et al. | 701/30 |
| 2011/0172874 A1* | 7/2011 | Patnaik et al. | 701/33 |

* cited by examiner

AGGREGATED INFORMATION FUSION FOR ENHANCED DIAGNOSTICS, PROGNOSTICS AND MAINTENANCE PRACTICES OF VEHICLES

BACKGROUND OF THE INVENTION

1. Field of the Invention

This invention relates generally to a system and method for enhancing vehicle diagnostic and prognostic algorithms and, more particularly, to a system and method for enhancing vehicle diagnostic and prognostic algorithms and vehicle maintenance practices by fusing vehicle information from multiple sources.

2. Discussion of the Related Art

Diagnostics monitoring of various vehicle systems is an important vehicle design consideration so as to be able to quickly detect system faults, and isolate the faults for maintenance and service purposes. These vehicle systems typically employ various sub-systems, actuators and sensors, such as yaw rate sensors, lateral acceleration sensors, steering hand-wheel angle sensors, etc., that are used to help provide control of the vehicle. If any of the sensors, actuators and sub-systems associated with these systems fail, it is desirable to quickly detect the fault and activate fail-safe (fail-silent or fail-operational) strategies so as to prevent the system from improperly responding to a perceived, but false condition. It is also desirable to isolate the defective sensor, actuator or sub-system for maintenance, service and replacement purposes. Thus, it is necessary to monitor the various sensors, actuators and sub-systems employed in these systems to identify a failure.

It is a design challenge to identify the root cause of a fault and isolate the fault all the way down to the component level, or even the sub-system level, in a vehicle system. The various sub-systems and components in a vehicle system, such as vehicle brake system or a vehicle steering system, are typically not designed by the vehicle manufacturer, but are provided by an outside source. Because of this, these components and sub-systems may not have knowledge of what other sub-systems or components are doing in the overall vehicle system, but will only know how their particular sub-system or component is operating. Thus, these outside sub-systems or components may know that they are not operating properly, but will not know if their component or sub-system is faulty or another sub-system or component is faulty. For example, a vehicle may be pulling in one direction, which may be the result of a brake problem or a steering problem. However, because the brake system and the steering system do not know whether the other is operating properly, the overall vehicle system may not be able to identify the root cause of that problem.

Each individual sub-system or component may issue a diagnostic trouble code indicating a problem when they are not operating properly, but this trouble code may not be a result of a problem with the sub-system or component issuing the code. In other words, the diagnostic code may be set because the sub-system or component is not operating properly, but that operation may be the result of another sub-system or component not operating properly. It is desirable to know how reliable the diagnostics codes are from a particular sub-system or component to determine whether that sub-system or component is the fault of a problem.

Diagnostic and Prognostic techniques for vehicle state of health monitoring can help forecast the occurrence of a problem in order to take preventive measures before significant damage is done. These techniques become more important for systems where the failure of the system can have critical implications. Further, system manufacturers can help prevent their customers from being dissatisfied due to the failure of various systems by using diagnostic and prognostic techniques.

Efforts have been made in the past to develop diagnostic and prognostic techniques to detect and localize performance degradations in various operating systems. One existing method based on the principles of diagnosis and prognosis uses temporal data mining.

SUMMARY OF THE INVENTION

In accordance with the teachings of the present invention, a system and method are disclosed for enhancing vehicle diagnostic and prognostic algorithms and improving vehicle maintenance practices. The method includes collecting data from vehicle components, sub-systems and systems, and storing the collected data in a database. The collected and stored data can be from multiple sources for similar vehicles or similar components and can include various types of trouble codes and labor codes as well as other information, such as operational data and physics of failure data, which are fused together. The method generates classes for different vehicle components, sub-systems and systems, and builds feature extractors for each class using data mining techniques of the data stored in the database. The method also generates classifiers that classify the features for each class. The feature extractors and feature classifiers are used to determine when a fault condition has occurred for a vehicle component, sub-system or system.

Additional features of the present invention will become apparent from the following description and appended claims taken in conjunction with the accompanying drawings.

DETAILED DESCRIPTION OF THE EMBODIMENTS

Figure 1:
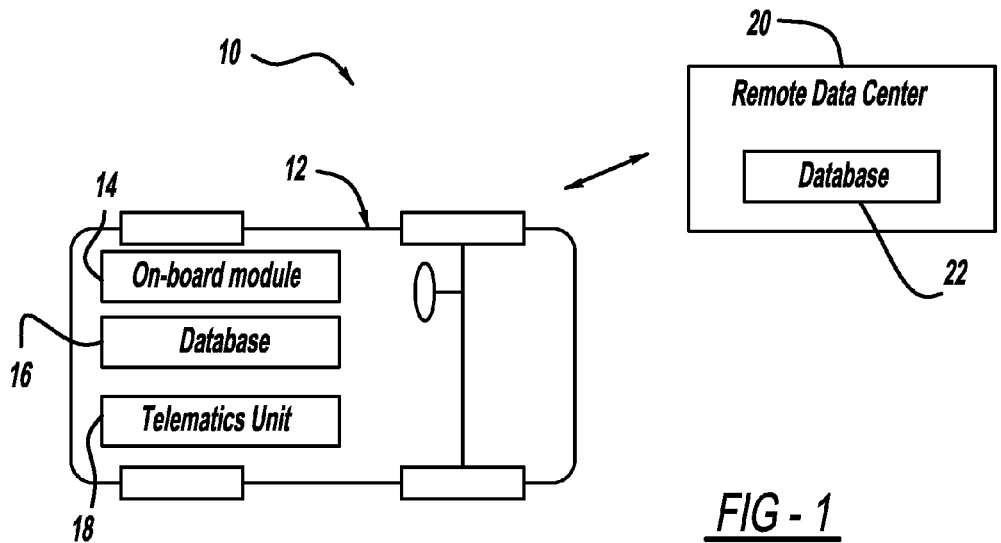
FIG. 1 is an illustration of a vehicle in communication with a remote data center.

The following discussion of the embodiments of the invention directed to a system and method for enhancing vehicle diagnostics and prognostics algorithms by fusing information from multiple sources is merely exemplary in nature, and is in no way intended to limit the invention or its applications or uses.

As will be discussed below, the present invention proposes a system and method for enhancing vehicle diagnostics and prognostics algorithms without additional sensors or detection circuits, which also may result in improvements to vehicle maintenance procedures. Multiple diagnosis and prognosis systems and component features are fused together to enhance the performance of the diagnosis and prognosis system either on-board the vehicle or by data uploaded and processed remotely. The process combines information from multiple vehicles, vehicle systems and components, both normal and faulty. Multiple features and classifiers are defined through data mining techniques either off-line or in real-time. The classifiers are then combined for robust diagnostics and prognostics. Differences for morphing models can be used for prognostics and failure prediction.

The fault development process of a component or system for a vehicle usually consists of a series of degraded states. Data is obtained for multiple normal and fault vehicle systems and states, and is stored either on the vehicle or remotely. The form of the data can be either measured signals, symbols or signals that have some processing performed so as to make them more sensitive to specific component or sub-system degradations. The signals can also be converted to symbols. The symbols can be low resolution extracts of the vehicle signals. Data will be especially rich for those events and failures that cause a diagnostic trouble code (DTC) to be set. Additional information can be obtained by examining the physics of failure and the operational characteristics of the data for events that do not provide diagnostics codes.

The basic idea of the invention is to apply data mining techniques to consolidated information and then to integrate the knowledge obtained from the data mining into on-board or remote diagnostic algorithms for better fault identification and isolation. The advantage of this method is that it does not require any additional sensors or detection circuits. By correlating the mined information with other information, such as vehicle fault codes and vehicle repair history information, such as DTCs and labor codes, the algorithm is able to provide better vehicle diagnostic algorithms and strategies for maintenance practices.

The diagnosis and prognosis process may involve feature extraction and feature classification. After being extracted from some system information, such as vehicle signals and discrete events, the features go through classifiers to provide final diagnosis and prognosis results. The feature extraction and classification can be done on a just-in-time basis interacting with existing mined data or by classifiers and feature extractors that are pre-built and defined using the data. Classifiers can also be dynamically updated, such as by telematics, using additional data that becomes available through vehicle usage patterns to provide enhanced diagnostics. Classifiers are defined that can determine degraded vehicle states. Classifiers with multiple classes/states, such as support vector machines, hidden Markov models, etc., can be generated and implied. Given any data set, a probability associated with each class/state will be generated, which can be used to infer the state of health of the components and systems.

A vehicle health monitor can be obtained by proactively monitoring the vehicle state of health (sub-system level to vehicle level) through comparison of a reference model, or reference data, and actual vehicle behavior using on-board sensors. If the health monitor notices an impending problem or diagnoses a problem, additional data is collected and notification of a problem is issued. The appropriate service parts and fault repair solution that is required is transmitted to an off-site installation through a telematics system or via a vehicle-to-infrastructure architecture.

Multiple features and multiple classifiers can be combined for enhancing the overall vehicle diagnostic and prognostic performance. It can also be used for vehicle diagnostic and prognostics at a vehicle model or sub-system level, for example, to determine unusually early component failure rates of components or systems.

Different features provide diagnosis and prognosis information of different levels. For example, minimum voltage and high frequency resistance both give battery state of health information, but represent different battery characteristics. Combining several features will provide a more reliable diagnosis and prognosis result.

By using different classifiers, a feature can provide different types of diagnosis and prognosis results, such as a binary type result, a percentage type result, or probability-based diagnosis and prognosis results that indicate different probabilities of a potential fault. Fusing multiple classifiers also gives a more reliable and advanced diagnosis and prognosis results, such as how much time a component can last. In many applications it is better to fuse multiple relatively simple classifiers together than to try to build a single sophisticated classifier to achieve better diagnosis and prognosis results.

The fusion of multiple features and multiple classifiers for vehicle diagnosis and prognosis will increase reliability, robustness and feasibility. The fusion methods can be based on all kinds of fusion theories, such as probability theory and decision theory. Single and/or multiple classifiers are used to assess the system state of health based on each feature with a confidence level attached to it. The classification of the multiple features is fused by using a decision block, such as a rule-based methodology or any other decision system, to enhance the robustness of the system.

FIG. 1 is an illustration of a system 10 including a vehicle 12 having an on-board module 14 that operates diagnosis and prognosis algorithms for monitoring the state of health of various vehicle components, sub-systems and systems of the discussed above information and data collected by the on-board module 14 can be stored in a database 16 on the vehicle 12. The vehicle 12 includes a telematics unit 18 that broadcasts messages wirelessly including diagnostic trouble codes and the like that may identify a particular vehicle problem as processed by the on-board module 14 and stored in the database 16. Those messages may be received by a remote data center 20 that analyzes the information, and fuses data stored in a database 22 that may include information concerning the same or a related problem on a similar vehicle. As will be discussed in further detail below, the remote data center 20 provides data fusing, feature extraction, classification and other data analysis techniques to help identify and isolate the problem provided in the message.

Figure 2:
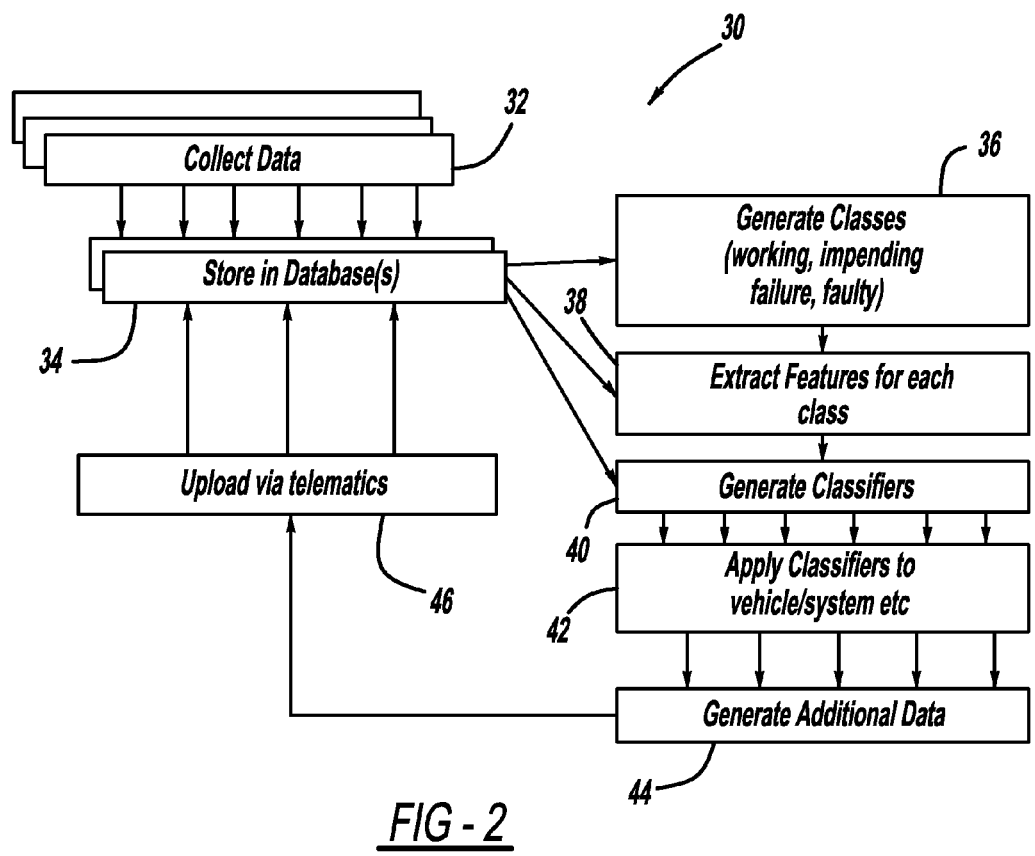
FIG. 2 is a flow chart diagram showing a process for collecting and using data from a vehicle for an enhanced vehicle diagnostics and prognostics algorithm of the invention.

FIG. 2 is a flow chart diagram 30 showing a process for enhancing vehicle diagnostic and prognostic algorithms by fusing data from multiple sources based on the discussion above. At box 32, the process collects data on the vehicle 12 for the various and several vehicle components, sub-systems and systems that are being monitored for diagnostic and prognostic purposes. The collected data can be for components, sub-systems and systems that may be in a fault or non-fault condition so that the operation of the component, sub-system or system can be analyzed for both occurrences. The collected data is stored in a database at box 34, which may be on the vehicle 12 or at the remote data center 20. The stored data at the box 34 is then sent to the remote data center 20 and used to generate classes of data or information at box 36. These classes of data can be any suitable classification that the particular algorithm is programmed to analyze. For example, the classifications can be working components, components with impending failures, components that are currently faulty, etc.

The identified classes at the box 36 and the stored data from the box 34 are then sent to box 38 that extracts features from the data for each class. Feature extraction of data, particularly in the vehicle environment, is a well known process and multiple well known algorithms and mechanisms can be used for feature extraction, such as support vector machines. The feature extraction is provided for each separate class because data for one class may not be suitable or desirable for data for another class. Once the features for each class are extracted at the box 38, then the extracted features are used to generate classifiers for the various components, sub-systems and systems and box 40 using the stored data at the box 34 so that an analysis of the data can be used to determine when a fault condition exists for the particular component, sub-system and system. The classified information is then applied to the specific component, sub-system and system at box 42 to determine whether those components, sub-systems and systems may have a fault. Additional data may be added to the classified components, sub-systems and systems at box 44, such as data from physics of failure and operational characteristics of data for events that do not have diagnostic codes. The information for the components, sub-systems and systems is then uploaded telematically at box 46 to the vehicle 12 to identify the failure, which may be stored in the database 22 at the box 34.

Figure 3:
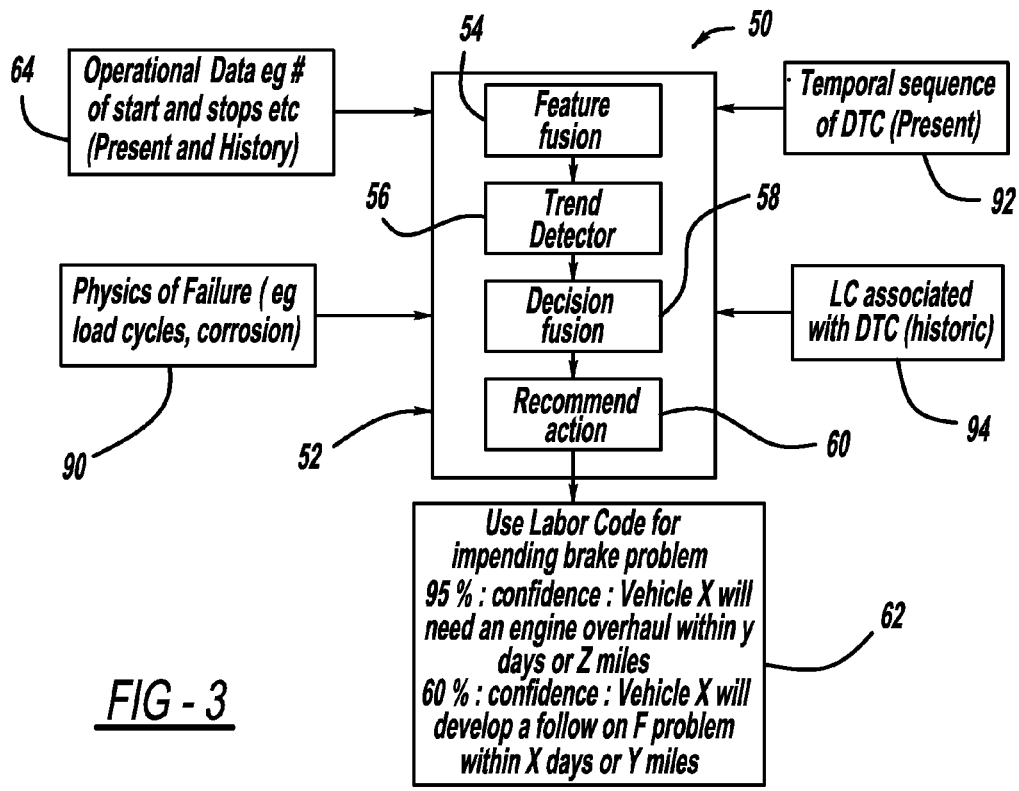
FIG. 3 is a flow chart diagram showing a process for providing information fusion and maintenance recommendations.
Figure 4:
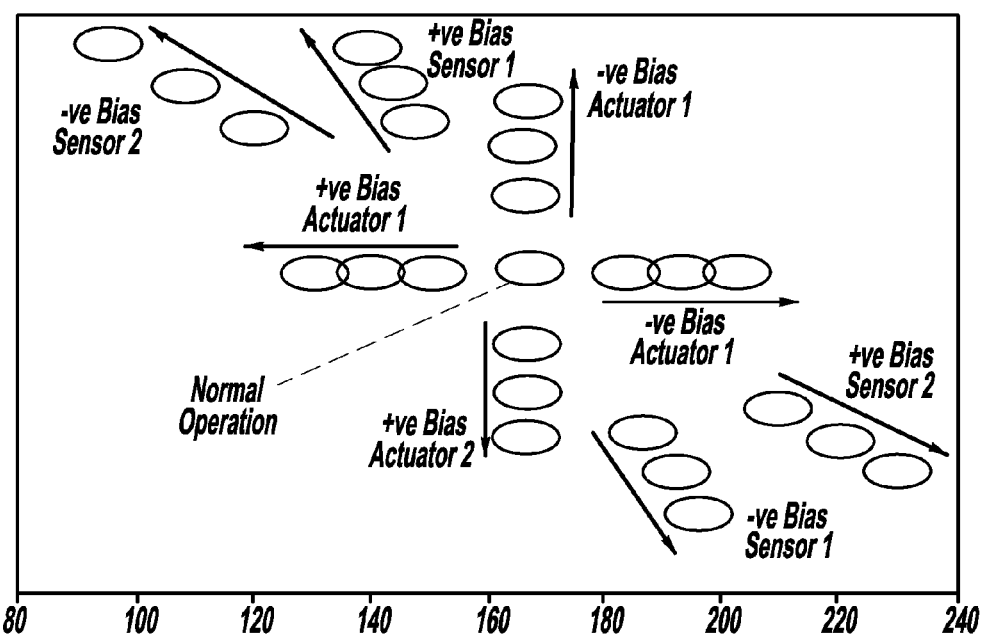
FIG. 4 is a graph showing supporting diagnostics based on classification for the maintenance recommendation box shown in FIG. 3.

FIG. 3 is a flow chart-type diagram 50 showing a process for fusing data as discussed above, and providing improvements for vehicle maintenance products. At box 52, the algorithm goes through a process for determining whether a component, sub-system or vehicle system is faulty based on the collected data and other information that is available. Particularly, at box 54 the algorithm provides feature fusion between different features of different components and so forth, and is similar to extracting features for each class that was generated at the box 38. The algorithm uses the feature fusion to determine trend detections at box 56, particularly whether a particular component, sub-system or system may fail at some point in the future as a result of the trend it is tracking based on previous known information about the component. The trend detection information is then used at decision fusion box 58 to determine whether an appropriate action should be taken based on the potential failure. From the decision fusion analysis, the algorithm makes a particular maintenance recommendation at box 60, which may include a labor code (LC) such as for an impending brake problem at box 62. For example, the decision fusion and recommendation process may provide a 95% confidence that the vehicle will need an engine overhaul within a certain number of days or a certain number of miles or a 60% confidence that the vehicle will develop a problem within a certain number of days or a certain number of miles. FIG. 4 is a chart showing supporting diagnostics based on a classification for the recommendation.

Figure 5:
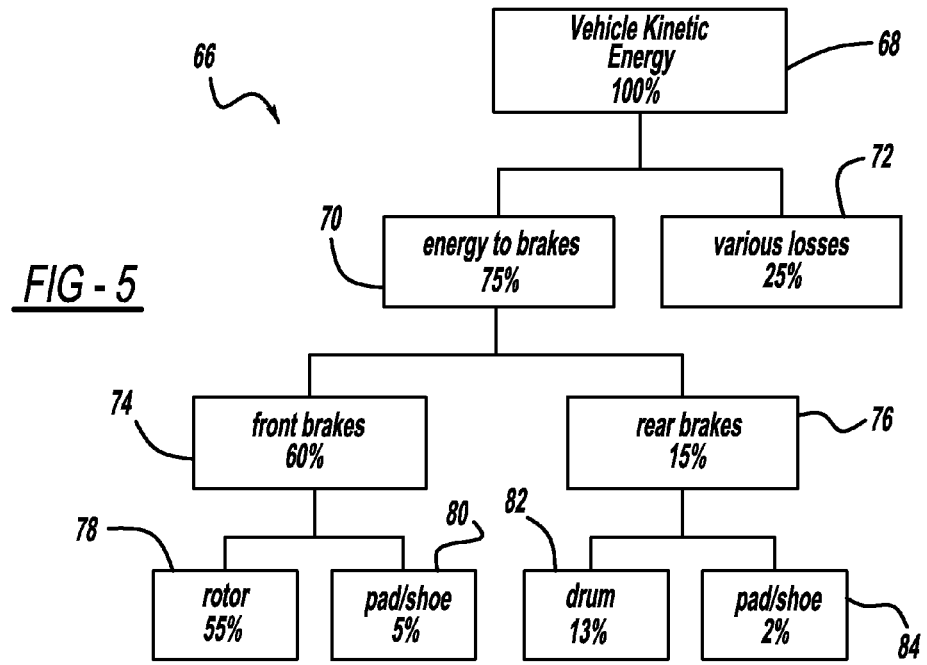
FIG. 5 is a flow chart diagram showing the break-up of a vehicle's kinetic energy when the vehicle is braked for a 0.3 g deceleration to a stop for the operational data box shown in FIG. 3.

The information that is used at the box 52 can be provided from any available source. For example, historical or present operational data, such as the number of start and stop episodes, can be provided at box 64. FIG. 5 is a flow chart diagram 66 showing an example of the kind of data that can be provided at the box 64 and used by the fusion process at the box 52, particularly the break-up of a vehicle's kinetic energy when the vehicle is braked for a 0.3 g deceleration to a stop. The diagram 66 shows kinetic energy losses of the vehicle from braking starting at a vehicle kinetic energy of 100% at box 68. From there, 75% of the kinetic energy is lost to the brakes and 25% of the kinetic energy is dissipated in other losses at box 72. For the energy that is lost to the brakes at the box 70, 60% is lost to the front brakes at box 74 and 15% is lost to the rear brakes at box 76. Of the kinetic energy lost to the front brakes at the box 74, 55% of the kinetic energy is lost to the rotor at box 78 and 5% of the kinetic energy is lost to the pads and shoes at box 80. Of the kinetic energy lost to the rear brakes at the box 76, 13% of the kinetic energy is lost to the brake drum in box 82 and 2% of the kinetic energy is lost to the pads and shoes at box 84.

Figure 6:
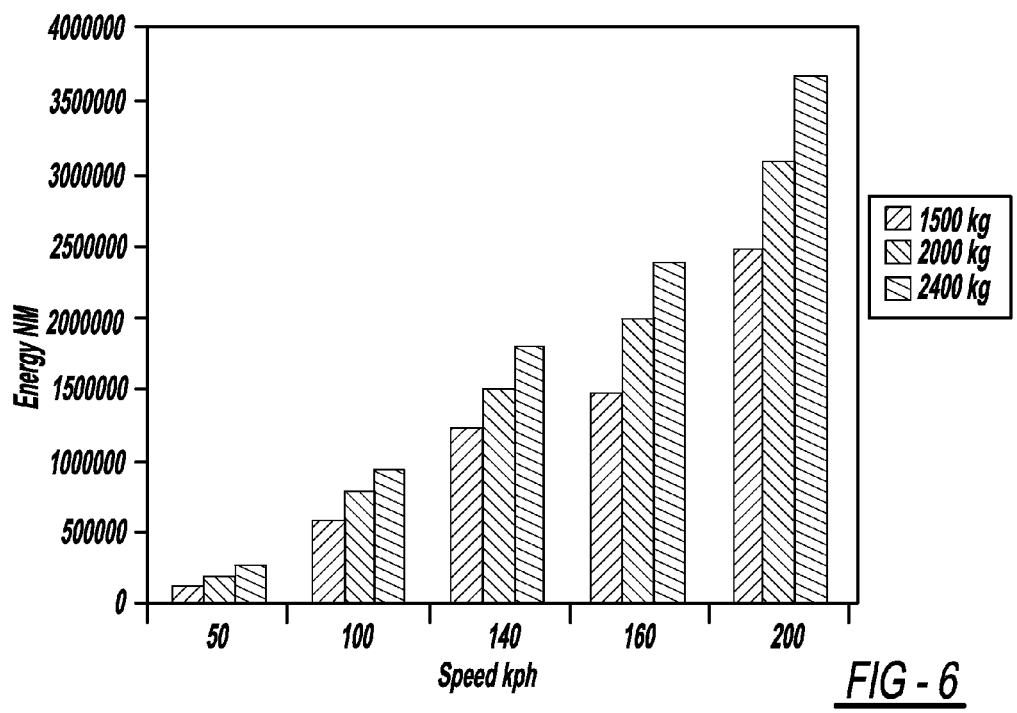
FIG. 6 is a is a graph with speed on the horizontal axis and energy on the vertical axis showing a representation of brake energy as a function of vehicle speed and weight and is the type of information that can be provided by the physics of failure box in FIG. 3.

Further, information from physics of failure, such as road cycles and corrosion, can be provided at box 90. As an example FIG. 6 is a chart with speed on the horizontal axis and energy on the vertical axis that shows the type of information that can be provided which is a representation of brake energy as a function of vehicle speed and weight. The information that is fused to determine prognosis and diagnosis at the box 52 from the operational data at the box 64 and the physics of failure at the box 90 is the type of additional information that can be provided that does not include various trouble codes in the like.

The information provided to the box 52 that does include various trouble codes are represented at box 92 identifying a present temporal sequence of diagnostic trouble codes (DTCs) and at box 94 representing labor codes associated with historic DTCs.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing vehicle diagnostics and prognostics evaluations, said method comprising:
    collecting data from multiple components, sub-systems and systems of a vehicle and from multiple vehicle sources including components, sub-systems and systems for different vehicles;
    storing the collected data in one or more databases;
    generating classes for different types of collected data, where the classes include working, impending failure and faulty;
    fusing the collected data from the vehicle's components, sub-systems and systems and the multiple vehicle sources; and
    analyzing the fused data to identify fault conditions in the vehicle's components, sub-systems and systems.

2. The method according to claim 1 wherein fusing the collected data includes building feature extractors for each class using data mining techniques of the data stored in the databases, generating feature classifiers that classify features for each class, and using the feature extractors and the feature classifiers to determine when a fault condition has occurred for a component, sub-system or system of the vehicle.

3. The method according to claim 2 further comprising combining outputs from multiple feature classifiers to increase the robustness for determining when a fault condition occurs.

4. The method according to claim 2 further comprising using the features extractors and the feature classifiers to update previous feature classifiers.

5. The method according to claim 1 further comprising using the fused data to improve vehicle maintenance procedures.

6. The method according to claim 1 wherein collecting data includes collecting data from the vehicle's components, sub-systems and systems for both fault and non-fault conditions.

7. The method according to claim 1 further comprising transmitting the collected data telematically from the vehicle to a remote data center.

8. The method according to claim 7 wherein storing the collected data in a database includes storing the collected data in one or both of a database on the vehicle and a database at the remote data center.

9. The method according to claim 1 wherein collecting data includes collecting data that does not include trouble codes.

10. The method according to claim 9 wherein collecting data that does not include trouble codes includes collecting one or both of data related to physics of failure and operational data.

11. A method for providing vehicle diagnostics and prognostics evaluations, said method comprising:
 collecting data from vehicle components, sub-systems and systems on vehicles;
 storing the collected data in a database either onboard the vehicles or off-board the vehicles;
 telematically transmitting the collected data from the vehicles to a remote data center;
 generating classes for different types of the collected data at the remote data center, where the classes include working, impending failure and faulty;
 building feature extractors for each class using data mining techniques of the data stored in the database at the remote data center;
 generating feature classifiers that classify features for each class at the remote data center;
 using the feature extractors and the feature classifiers to determine when a fault condition has occurred for a vehicle component, sub-system or system;
 combining outputs for multiple feature classifiers to increase the robustness for determining when a fault condition occurs; and
 transmitting fault condition results back to the vehicles.

12. The method according to claim 11 wherein collecting data includes collecting data from multiple components, sub-systems and systems onboard multiple different vehicles.

13. The method according to claim 11 further comprising using the feature extractors and feature classifiers to determine when a fault condition has occurred to improve vehicle maintenance procedures.

14. The method according to claim 11 wherein collecting data includes collecting data from the vehicle components, sub-systems and systems for both fault and non-fault conditions.

15. The method according to claim 11 further comprising using the features extractors and the feature classifiers to update previous feature classifiers.

16. The method according to claim 11 wherein collecting data includes collecting one or both of data relating to physics of failure and operational data.

17. A system for providing vehicle diagnostics and prognostics evaluations, said system comprising:
 means for collecting data from vehicle components, sub-systems and systems on a vehicle;
 means for storing the collected data in a database on the vehicle;
 means for transmitting the collected data telematically to a remote data center;
 means for generating classes for different types of collected data at the remote data center, where the classes include working, impending failure and faulty;
 means for building feature extractors for each class using data mining techniques of the data stored in a database on the remote data center;
 means for generating feature classifiers that classify the features for each class; and
 means for using the feature extractors and feature classifiers to determine when a fault condition has occurred for a vehicle component, sub-system or system.

18. The system according to claim 17 wherein the means for collecting data includes means for collecting data from multiple different vehicles.

19. The system according to claim 17 further comprising means for combining outputs from multiple feature classifiers to increase the robustness for determining when a fault condition occurs.

20. The system according to claim 17 further comprising means for using the feature extractors and the feature classifiers to determine when a fault condition has occurred to improve vehicle maintenance procedures.

* * * * *